United States Patent
Mikami (10) Patent No.: US 9,002,360 B2
(45) Date of Patent: Apr. 7, 2015

(54) RECEPTION QUALITY MEASUREMENT METHOD AND MOBILE TERMINAL APPARATUS

(71) Applicant: Fujitsu Limited, Kawasaki, Kanagawa (JP)

(72) Inventor: Satoshi Mikami, Kawasaki (JP)

(73) Assignee: Fujitsu Limted, Kawasaki (JP)

( * ) Notice: Subject to any disclaimer, the term of this patent is extended or adjusted under 35 U.S.C. 154(b) by 0 days.

(21) Appl. No.: 13/933,727

(22) Filed: Jul. 2, 2013

(65) Prior Publication Data

US 2014/0011501 A1    Jan. 9, 2014

(30) Foreign Application Priority Data

Jul. 5, 2012  (JP) .................. 2012-151850

(51) Int. Cl.
*H04W 36/00* (2009.01)
*H04W 36/30* (2009.01)

(52) U.S. Cl.
CPC .......... *H04W 36/30* (2013.01); *H04W 36/0083* (2013.01)

(58) Field of Classification Search
USPC ........... 455/436–444; 370/328, 329, 331–333
See application file for complete search history.

(56) References Cited

U.S. PATENT DOCUMENTS

| | | | |
|---|---|---|---|
| 2011/0164659 A1* | 7/2011 | Kawamura et al. | 375/133 |
| 2013/0077513 A1* | 3/2013 | Ng et al. | 370/252 |
| 2013/0258883 A1* | 10/2013 | Vargas Bautista et al. | 370/252 |
| 2013/0279423 A1* | 10/2013 | Ahn et al. | 370/328 |
| 2013/0308485 A1* | 11/2013 | Krishnamurthy et al. | 370/252 |
| 2014/0099939 A1* | 4/2014 | Uemura et al. | 455/422.1 |
| 2014/0112310 A1* | 4/2014 | Teyeb et al. | 370/332 |
| 2014/0200016 A1* | 7/2014 | Siomina et al. | 455/450 |

FOREIGN PATENT DOCUMENTS

JP     2010-050557 A     3/2010

* cited by examiner

Primary Examiner — Ajit Patel
(74) Attorney, Agent, or Firm — Arent Fox LLP

(57) ABSTRACT

There is provided a reception quality measurement method that measures reception quality of a measurement target cell with a mobile terminal apparatus. The method includes performing reception quality measurements in a certain bandwidth with respect to each of a plurality of frequencies in a frequency band of the measurement target cell when the frequency band of the measurement target cell and a frequency band of a neighboring cell overlap with each other, and averaging results of the reception quality measurements at the plurality of frequencies to obtain an averaged value as the reception quality of the measurement target cell.

14 Claims, 8 Drawing Sheets

| FFT SYSTEM BAND WIDTH | FFT SIZE | FFT EFFECTIVE Sub Carrier NUMBER |
|---|---|---|
| 1.4 MHz | 128 | 72 |
| 3 MHz | 256 | 180 |
| 5 MHz | 512 | 300 |
| 10 MHz | 1024 | 600 |
| 15 MHz | 2048 | 900 |
| 20 MHz | 2048 | 1200 |

TABLE 5.7.3-1 E-UTRA CHANNEL NUMBERS

| E-UTRA OPERATING BAND | DOWNLINK | | | UPLINK | | |
|---|---|---|---|---|---|---|
| | $F_{DL\_low}$ (MHz) | $N_{Offs-DL}$ | RANGE OF $N_{DL}$ | $F_{UL\_low}$ (MHz) | $N_{Offs-UL}$ | RANGE OF $N_{UL}$ |
| 1 | 2110 | 0 | 0 - 599 | 1920 | 18000 | 18000 - 18599 |
| ⋮ | ⋮ | ⋮ | ⋮ | ⋮ | ⋮ | ⋮ |

FIG. 9B

| BANDWIDTH (MHz) | 1.4 | 3 | 5 | 10 | 15 | 20 |
|---|---|---|---|---|---|---|
| N (RBs) | 6 | 15 | 25 | 50 | 75 | 100 |

RECEPTION QUALITY MEASUREMENT METHOD AND MOBILE TERMINAL APPARATUS

CROSS-REFERENCE TO RELATED APPLICATION

This application is based upon and claims the benefit of priority of the prior Japanese Patent Application No. 2012-151850, filed on Jul. 5, 2012, the entire contents of which are incorporated herein by reference.

FIELD

The embodiments discussed herein are related to a mobile terminal apparatus and a reception quality measurement method for measuring reception quality of a measurement target cell with a mobile terminal apparatus.

BACKGROUND

Of mobile communication systems, by introduction of High Speed Downlink Packet Access (HSDPA), a Third Generation (3G) mobile communication system utilizing W-CDMA technology has been satisfying market demands for several years and now secured a competitive position against other systems. However, in the coming years, a long-term technological development is desirable to cope with rapidly increasing multimedia traffics and ubiquitous traffics. In standards of Third Generation Partnership Project (3GPP) that is a standards body, wireless communication systems defined as Long Term Evolution (LTE), or Evolved Universal Terrestrial Radio Access (E-UTRA) and Evolved Universal Terrestrial Radio Access Network (E-UTRAN) are gaining popularity. In LTE, a delay time is improved from about 10 ms to 5 ms or less compared to Third Generation (3G), and throughput is improved by a factor of 2 to 4 compared to HSDPA, improving utilization efficiency of frequency.

In considering improvement of accuracy in measurement for reception quality or reduction of circuit size on a mobile terminal side as described above, it is also desirable to consider a frequency operation of LTE, 3G, and the like on a network carrier side.

An operation of LTE cell reselection in 3GPP Release 9 is described below. The operation is described for a case where a mobile terminal located in a LTE serving cell is making the switch to 3G Universal Mobile Telecommunication System (UMTS). When threshServingLowQ is set in the system information block 3 to be transmitted from the LTE cell, it is stipulated that the operation is determined based on threshold determination of reference signal received quality (RSRQ). On the other hand, When the threshServingLowQ is not set, it is stipulated that the operation is determined based on the threshold determination of reference signal received power (RSRP).

Furthermore, in a case where a mobile terminal located in a UMTS serving cell is making the switch to LTE, it is stipulated that the operation is determined based on the threshold determination of RSRQ when both high2 of Threshx and low2 of Threshx are set in the system information block 19 of the UMTS cell. On the other hand, when either one of high2 of Threshx and low2 of Threshx is not set, it is stipulated that the operation is determined based on the threshold determination of RSRP. In this way, in 3GPP Release 9, the cell reselection operation is determined based on the threshold of RSRP or RSRQ.

Thus, when performing the threshold determinations of RSRP and RSRQ, it is desirable for the mobile terminal to carry out accurate reception quality measurements such as RSRP, RSRQ, and the like.

For example, Japanese Laid-open Patent Publication No. 2010-050557 discusses a technology that estimates noise power even when a desired signal and an interfering signal are overlapping to each other.

SUMMARY

According to an aspect of the invention, a reception quality measurement method for measuring reception quality of a measurement target cell with a mobile terminal apparatus, the method includes performing reception quality measurements in a certain bandwidth with respect to each of a plurality of frequencies in a frequency band of the measurement target cell when the frequency band of the measurement target cell and a frequency band of a neighboring cell overlap with each other, and averaging results of the reception quality measurements at the plurality of frequencies to obtain an averaged value as the reception quality of the measurement target cell.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preliminary Consideration

Figure 1A:
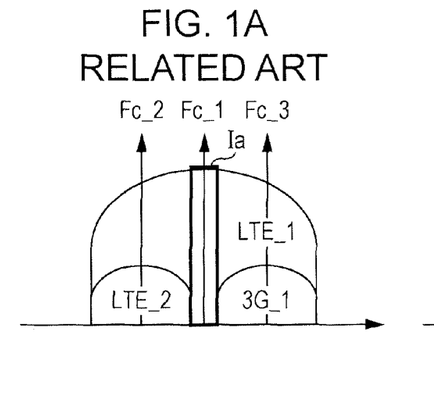
FIG. 1A and FIG. 1B are explanatory diagrams for examples of reception quality measurement in related art.
Figure 1B:
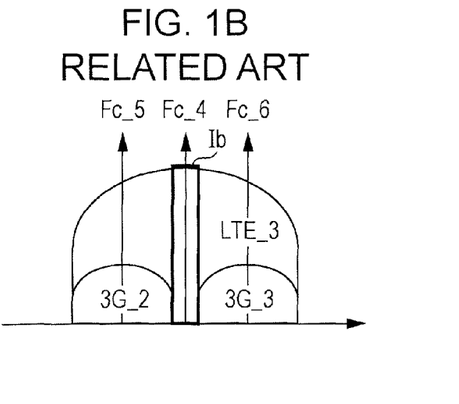

Some problems in related art will be described. Depending on the frequency operation of network carriers, it is possible that a frequency band of any LTE cell overlaps with a frequency band of another LTE cell or a 3G cell. FIG. 1A and FIG. 1B illustrate examples of the reception quality measurement in the related art. FIG. 1A illustrates an example in which LTE (LTE_1) with a 10 MHz bandwidth overlaps with 3G (3G_1) and LTE (LTE_2) each having a 5 MHz bandwidth. FIG. 1B illustrates an example in which LTE (LTE_3) with a 10 MHz bandwidth overlaps with two frequencies of 3G (3G_2, 3G_3) each having a 5 MHz bandwidth.

Here, in 3GPP TS 36.133 that is 3GPP standardization specifications, it is stipulated to perform the measurement with a 1.4 MHz bandwidth when performing a LTE reception measurement process. Thus, it is not stipulated to perform the reception measurement process across the entire bandwidth with which a mobile terminal is receiving communication services. In other words, the measurement with a 1.4 MHz bandwidth provides the advantage of reducing circuit size and current consumption.

However, in a center frequency part Fc_1 of LTE_1 with a 10 MHz bandwidth illustrated in FIG. 1A, there is a region where the frequencies of LTE_2 and 3G_1 with a 5 MHz bandwidth do not overlap therewith. Furthermore, in a center frequency part Fc_4 of LTE_3 with a 10 MHz bandwidth illustrated in FIG. 1B, there is a region where the frequencies of 3G_2 and 3G_3 with a 5 MHz bandwidth do not overlap therewith. In those cases, when the center frequency parts Fc_1 and Fc_4 are each measured with a 1.4 MHz bandwidth, which are illustrated as areas surrounded by solid lines Ia and Ib, parts of the bands where the frequencies do not overlap are being measured. Thus, RSRQ may not be measured properly. In such a case, the following cases may occur.

Case 1: RSRQ of the serving cell may not be measured properly at the time of handover from LTE with a 10 MHz bandwidth to LTE or 3G with a 5 MHz bandwidth.

Case 2: RSRQ of neighboring cells may not be measured properly at the time of handover from LTE with a 5 MHz bandwidth to LTE with a 10 MHz bandwidth.

Case 3: RSRQ of neighboring cells may not be measured properly at the time of handover from 3G with a 5 MHz bandwidth to LTE with a 10 MHz bandwidth.

Furthermore, in the foregoing examples, the bandwidths of LTE_1 and LTE_3 are assumed 10 MHz. However, even in cases where the bandwidths of LTE_1 and LTE_3 are 15 MHz or 20 MHz, similar problems may occur when LTE_2, 3G_1, 3G_2, and 3G_3 each with a 5 MHz bandwidth are combined therewith.

Figure 2A:
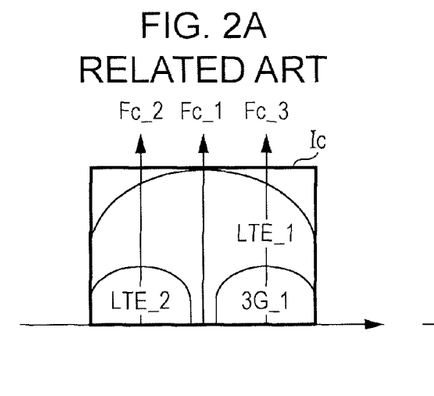
FIG. 2A and FIG. 2B are explanatory diagrams for other examples of the reception quality measurement in related art.
Figure 2B:
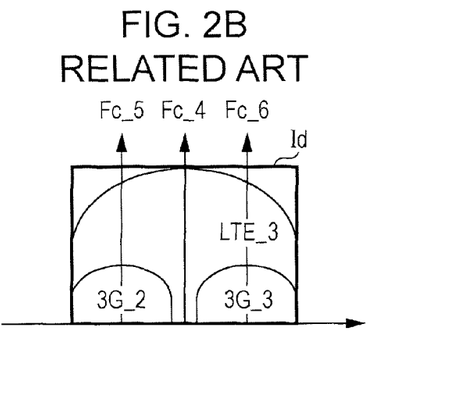

FIG. 2A and FIG. 2B illustrate other examples of the reception quality measurement in related art. In FIG. 2A, the reception quality measurement of LTE_1 with a 10 MHz bandwidth is performed across the entire 10 MHz bandwidth, which is illustrated as an area surrounded by a solid line Ic, and results of the measurements across the entire bandwidth are averaged. In this case, even if there is a region at which LTE_1 does not overlap with the frequencies of LTE_2 and 3G_1 each with a 5 MHz bandwidth, it is possible to perform the reception quality measurement in consideration of interfering bands due to overlapping of LTE_1 with the frequencies of LTE_2 and 3G_1.

Similarly, in FIG. 2B, the reception quality measurement of LTE_3 with a 10 MHz bandwidth is performed across the entire 10 MHz bandwidth, which is illustrated as an area surrounded by a solid line Id, and results of the measurements across the entire bandwidth are averaged. In this case, even if there is a region at which LTE_3 does not overlap with the frequencies of 3G_2 and 3G_3 each with a 5 MHz bandwidth, it is possible to perform the reception quality measurement in consideration of interfering band due to overlapping of LTE_3 with the frequencies of 3G_2 and 3G_3.

Figure 3:
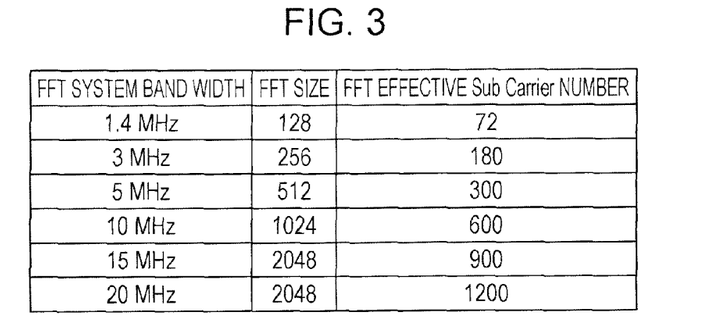
FIG. 3 is a diagram illustrating relationships among FFT system bandwidths, FFT sizes, and effective sub carriers.

However, measuring the entire bandwidth increases the circuit size and the current consumption as the bandwidth expands from 10 MHz to 15 MHz to 20 MHz. FIG. 3 illustrates relationships among FFT system bandwidths, FFT sizes, and effective sub carriers. As illustrated in FIG. 3, when the bandwidth expands, the FFT size and the effective sub carrier number for performing the reception quality measurement become larger. Thus, the amount of processing corresponding to the circuit size increases.

An object of a disclosed reception quality measurement method is to measure the reception quality of a measurement target cell with higher accuracy and less current consumption.

Hereinafter, embodiments are described with reference to the attached drawings.

Configuration of Mobile Terminal

Figure 4:
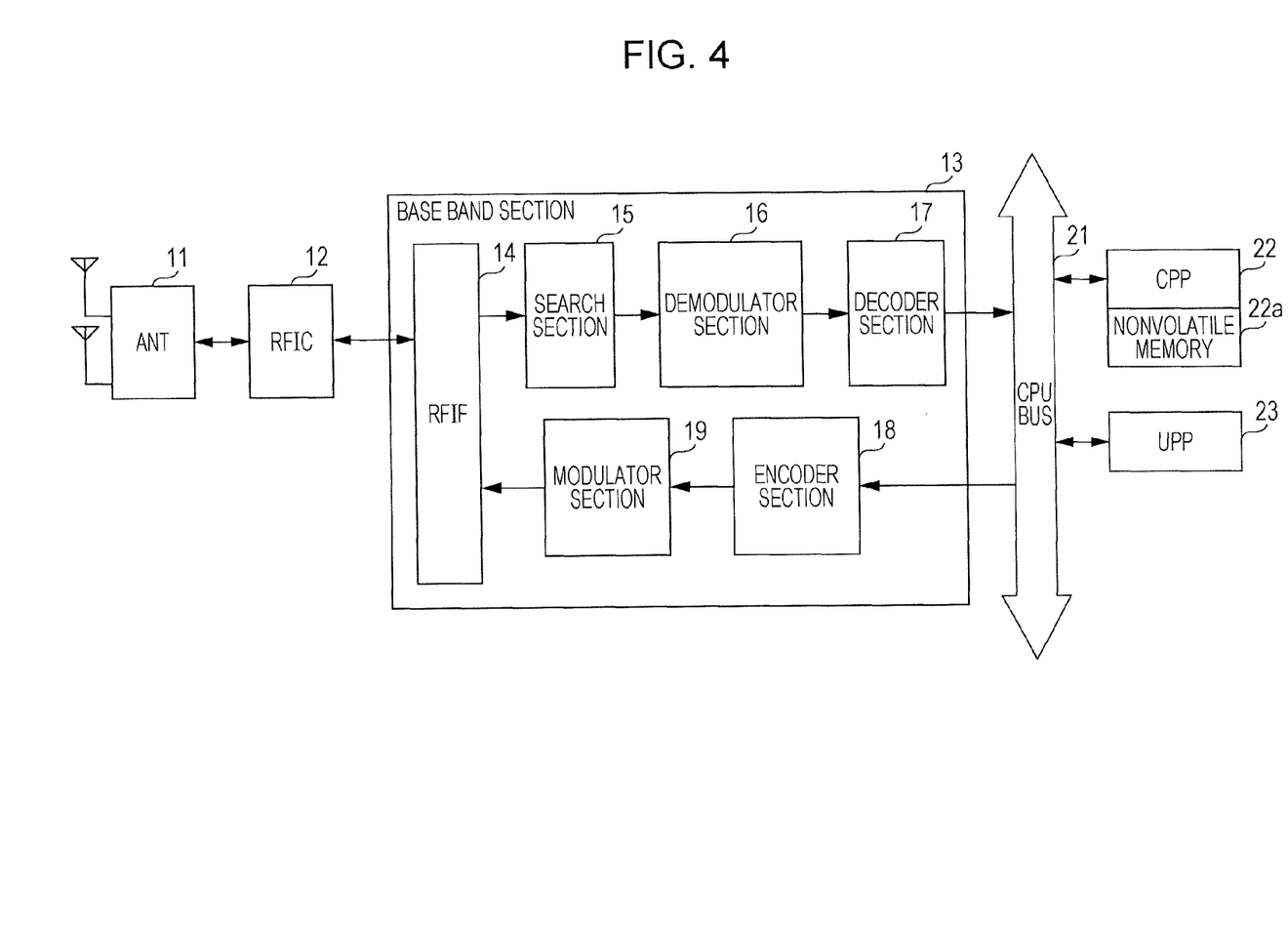
FIG. 4 is a configuration diagram of an embodiment of a mobile terminal apparatus.

FIG. 4 is a configuration diagram of an embodiment of a mobile terminal apparatus. In FIG. 4, an antenna 11 is mounted on the mobile terminal, and transmits and receives radio signals. A RFIC 12 up-converts a base band signal to be transmitted to a high frequency signal and supplies this high frequency signal to the antenna 11, and furthermore down-converts a high frequency signal received at the antenna 11 to a base band signal and supplies this base band signal to a RF interface 14. The RF interface (RFIF) 14 mediates a connection between the RFIC 12 and a plurality of radio access technology (RAT) in a base band section 13, such as a LTE system and 3G, Global System for Mobile communications (GSM (registered trademark)) or the like.

A search process section 15 in the base band section 13 performs respective search processes of a band search, a cell search, and a path search, detects beginning timing of cell, and performs a fast fourier transform (FFT) process. Furthermore, the search process section 15 calculates a received signal strength indicator (RSSI), RSRP, or the like.

A demodulator section 16 performs a channel estimation process and a demodulation process by using FFT process results supplied from the search process section 15. The demodulator section 16 further performs a decoding process of a physical control format indicator channel (PCFICH), a physical hybrid automatic repeat request indicator channel (PHICH), a physical downlink control channel (PDCCH), and a physical broadcast channel (PBCH). Furthermore, the demodulator section 16 has a propagation path environment measurement function such as generation of CQI or the like.

A decoder section 17 performs a de-rate matching process of a demodulated physical downlink shared channel (PDSCH), and executes processes from turbo decoding to a CRC checking process. With regard to PDSCH to be retransmitted, a HARQ combining process is performed before the turbo coding. Data decoded with the decoder section 17 is supplied to a C-plane processor (CPP) 22 and a U-plane processor (UPP) 23 through a CPU bus 21.

The CPP 22 performs mainly a Layer 3 protocol process and a reception quality measurement control process. The CPP 22 is provided with a nonvolatile memory 22a to be used in the reception quality measurement process. The UPP 23 performs mainly a Layer 2 protocol process.

A decoder section 18 of the base band section 13 performs processes of CRC attachment, turbo coding, rate matching, and scrambling on a uplink-shared channel (UL-SCH) supplied from the UPP 23. Furthermore, the decoder section 18 performs processes of CRC attachment, tail biting convolutional coding, Reed-Muller coding, rate matching, and scrambling on control information such as channel quality (CQI/PMI/RI), retransmission control (HARQ-ACK), or the like.

A modulator section 19 performs a modulating process, a discrete fourier transformation (DFT), and an inverse FFT (IFFT) conversion process on coded UL-SCH and accompanying control channels. Furthermore, the modulator section 19 performs processes of preamble generation, DFT, and inverse DFT (IDFT) at the time of random access channel (RACH) transmitting. The modulator 19 controls transmission by controlling timing using timing advance information.

Configuration of Search Process Section

Figure 5:
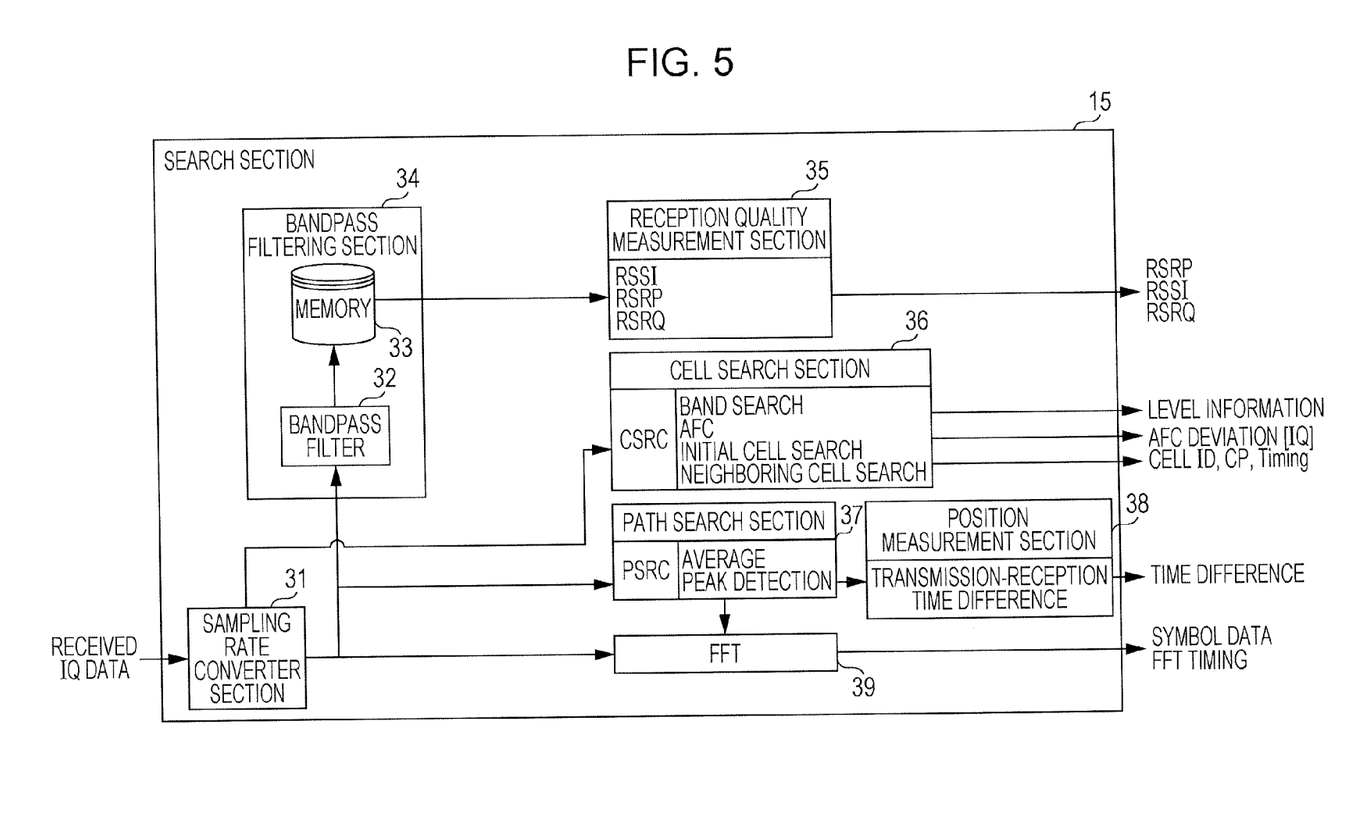
FIG. 5 is a configuration diagram of a first embodiment of a search process section.

FIG. 5 is a configuration diagram of a first embodiment of the search process section 15. In FIG. 5, a sampling rate converter section 31 converts a sampling rate (A) of A/D conversion in the RF interface 14 for the received base band signal to a sampling rate (B) of the base band section 13. As preprocessing of that conversion, an amplitude correction of the base band signal is performed. The sampling rate (A) varies in response to a system band, and the sampling rate (B) is fixed at 30.72 Msps. The base band signal, the sampling rate of which is converted, is supplied to a bandpass filtering section 34, a cell search section 36, a path search section 37, and a FFT section 39.

The bandpass filtering section 34 includes a bandpass filter 32 and a memory 33. The bandpass filter 32 performs filtering of the received signal of a measurement target cell for the reception quality measurement, and allows part of the received signal to pass with a passband of 1.4 MHz around a center frequency. Two independent circuits each including the bandpass filter 32 are provided when the number of reception antenna branches is two. The memory 33 stores an output signal of the bandpass filter 32. The memory 33 has a memory size large enough to store data of 5 ms+1 symbol (extended CP). The output signal of the bandpass filter 32, which is stored in the memory 33, is then supplied to a reception quality measurement section 35.

The reception quality measurement section 35 measures RSSI and RSRP of the measurement target cell from the output signal of the bandpass filter 32, and calculates RSRQ from the RSSI and RSRP thus measured. RSSI, RSRP, and RSRQ obtained here are transmitted to the CPP 22 as reception quality measurement results.

The cell search section 36 receives an output from the RF interface 14, performs processes of band search, AFC, initial cell search, and neighboring cell search, and transmits level information, AFC deviation, cell ID, timing information, and the like to the CPP 22.

The path search 37 receives the output from the RF interface 14, performs processes of averaging and peak detection, and supplies results of these processes to a position measurement section 38. The position measurement section 38 measures a transmission-reception time difference, and transmits this transmission-reception time difference to the CPP 22.

The FFT section 39 receives the output from the RF interface 14 and the transmission-reception time difference from the position measurement section 38, performs the FFT process on the output from the RF interface 14, and transmits FFT timing and symbol data that is a result of the process to the CPP 22.

Flowchart of Reception Quality Measurement Control

Figure 6:
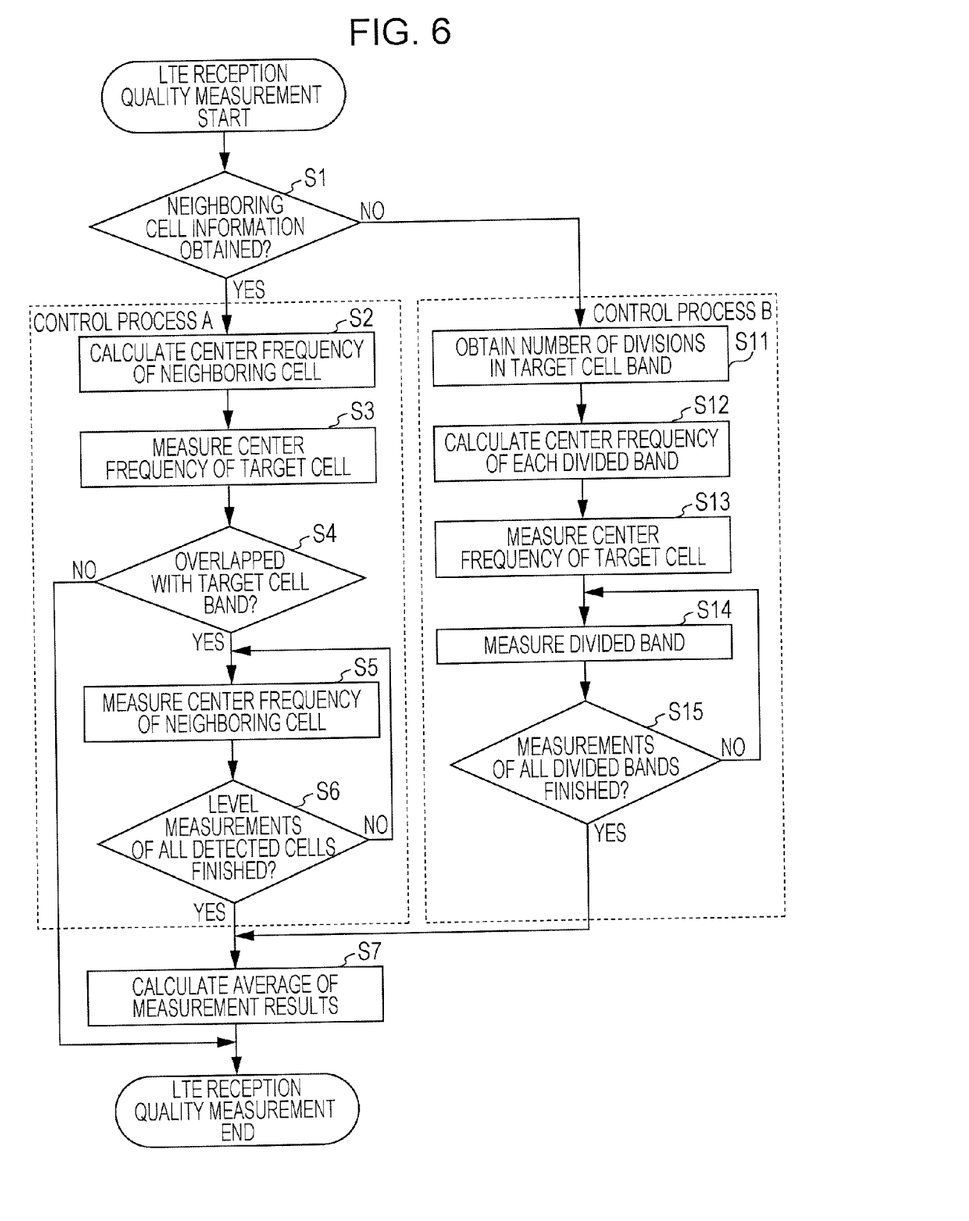
FIG. 6 is a flowchart of an embodiment of a LTE reception quality measurement process.

FIG. 6 is a flowchart of an embodiment of a LTE reception quality measurement process in the reception quality measurement section 35. This LTE reception quality measurement process is controlled and performed by the reception quality measurement control process that is performed by the CPP 22.

In FIG. 6, the CPP 22 determines in Step S1 whether or not neighboring cell information is already obtained from broadcast information transmitted from a serving cell (for example, LTE cell) in which a mobile terminal is located. When the neighboring cell information is already obtained, the process proceeds to Step S2 and performs a control process A of Steps S2 to S6. When the neighboring cell information is not obtained yet, the process proceeds to Step S11 and executes a control process B of Steps S11 to S15.

In Step S2, the CPP 22 calculates a center frequency of a neighboring cell from the neighboring cell information that is already obtained. Next, in Step S3, the CPP 22 performs the reception quality measurement of LTE that is the measurement target cell at its center frequency with a 1.4 MHz bandwidth.

Furthermore, in Step S4, the CPP 22 determines whether the center frequency of the neighboring cell overlaps with a band of the measurement target cell. When the center frequency of the neighboring cell overlaps with the band of the measurement target cell, the process proceeds to Step S5. When the center frequency of the neighboring cell does not overlap with the band of the measurement target cell, this process ends.

When the center frequency of the neighboring cell overlaps with the band of the measurement target cell, the reception quality measurement section 35 performs in Step S5 the reception quality measurement at the center frequency of the neighboring cell with a 1.4 MHz bandwidth. Next, in Step S6, the CPP 22 determines whether the reception quality measurement is performed at the center frequencies of all the neighboring cells for which the overlapping with the band of the measurement target cell is detected.

When the reception quality measurement is not finished for all the neighboring cells, the process returns to Step S5, and the reception quality measurement at the center frequency of the neighboring cell is repeated. When the reception quality measurement is finished for all the neighboring cells for which the overlapping with the band of the measurement target cell is detected, the process proceeds to Step S7. In Step S7, results of the reception quality measurement are averaged, and then this process ends.

Figure 7:
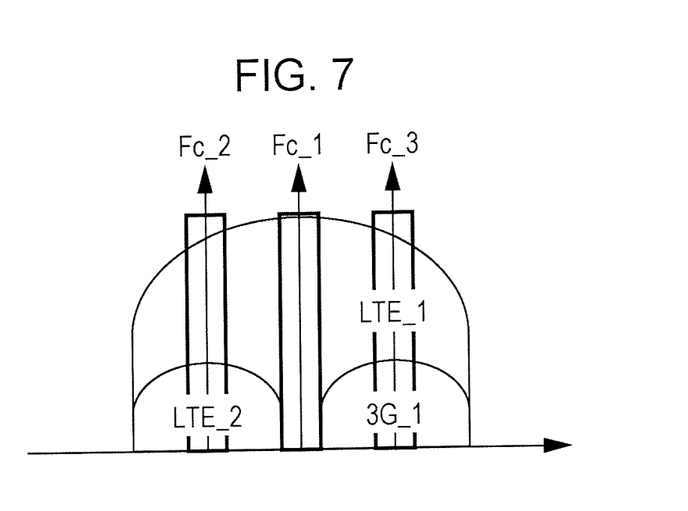
FIG. 7 is an explanatory diagram for a reception quality measurement in a case where neighboring cell information is already obtained.

FIG. 7 is an explanatory diagram for the reception quality measurement in a case where the neighboring cell information is already obtained. In FIG. 7, the serving cell in which the mobile terminal is located is LTE (LTE_1) having a 10 MHz bandwidth, and this LTE (LTE_1) overlaps with LTE (LTE_2) and 3G (3G_1) each having a 5 MHz bandwidth. Here, LTE_1 is the measurement target cell.

The center frequency of LTE_1 is Fc_1, the center frequency of LTE_2 is Fc_2, and the center frequency of 3G_1 is Fc_3. The mobile terminal has already obtained the center frequencies Fc_1, Fc_2, and Fc_3 from the neighboring cell information broadcasted from LTE_1. In this case, the reception quality measurement section 35 performs in Step S3 the reception quality measurement at the center frequency Fc_1 with a 1.4 MHz bandwidth, and further performs in Step S5 the reception quality measurements at the center frequencies Fc_2 and Fc_3 each with a 1.4 MHz bandwidth.

On the other hand, when the neighboring cell information has not been obtained in Step S1 of FIG. 6, the CPP 22 obtains in Step S11 the number of divisions of the measurement target cell's band. The number of divisions may be, for example, set in advance and stored in the nonvolatile memory 22a. Accordingly, the number of divisions in the nonvolatile memory 22a may be rewritten and updated, or set to different values in response to the bandwidth of the measurement target cell.

In Step S12, the CPP 22 divides the band of the measurement target cell by the number of divisions thus obtained, and calculates center frequencies of respective divided bands.

Next, in Step S13, the reception quality measurement section 35 performs the reception quality measurement of the measurement target cell that is the serving cell in which the mobile terminal is located at its center frequency with a 1.4 MHz bandwidth. Subsequently, in Step S14, the reception quality measurement section 35 performs the reception quality measurement at the center frequency of the divided band with a 1.4 MHz bandwidth.

Next, in Step S15, the CPP 22 determines whether the reception quality measurement is performed at the center frequencies of all the divided bands. When the reception quality measurement is not finished for all the divided bands, the process returns to Step S14, and the reception quality measurement at the center frequency of the divided band is repeated. When the reception quality measurement is finished for all the divided bands, the process proceeds to Step S7. In Step S7, results of the reception quality measurement are averaged, and then this process ends.

Figure 8:
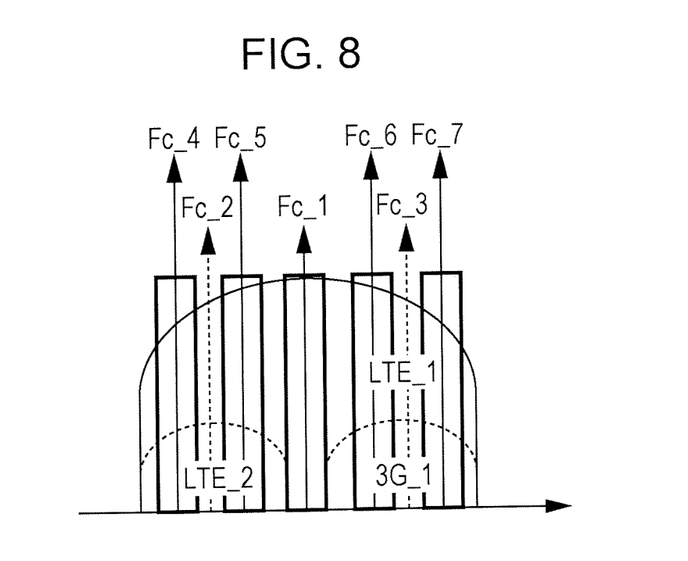
FIG. 8 is an explanatory diagram for a reception quality measurement in a case where neighboring cell information is not obtained yet.

FIG. 8 is an explanatory diagram for the reception quality measurement in a case where the neighboring cell information is not obtained yet. In FIG. 8, as is the case with FIG. 7, the mobile terminal is located in LTE (LTE_1) with a 10 MHz bandwidth, and this LTE (LTE_1) overlaps with 3G (3G_1) and LTE (LTE_2) each having a 5 MHz bandwidth. Here, LTE_1 is the measurement target cell.

Figure 9A:
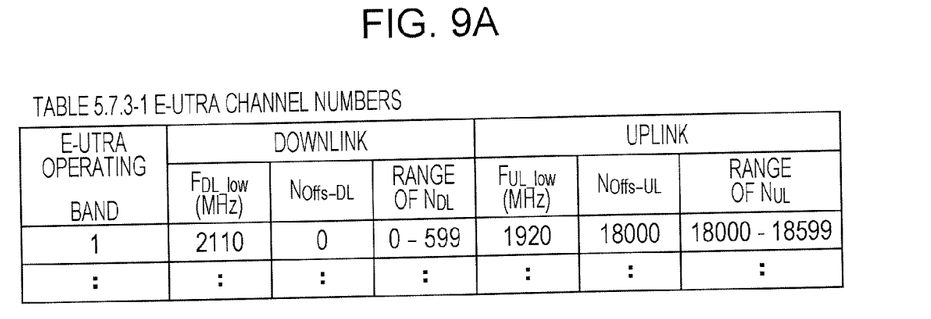
FIG. 9A and FIG. 9B are diagrams illustrating an example of EARFCN and relationships between RB numbers and bandwidths.

In specifications of 3GPP TS 36.101, a relation between a center frequency and an E-UTRA absolute radio frequency channel number (EARFCN) is expressed by the following equation (1). FIG. 9A illustrates an example of EARFCN. In the equation (1), parameters $F_{DL\_low}$, $N_{DL}$, and $N_{Offs-DL}$ are each determined in response to the value of EARFCN as illustrated in FIG. 9A.

$$F_{DL}=F_{DL\_low}+0.1(N_{DL}-N_{Offs-DL}) \quad (1)$$

For example, with regard to the measurement target cell LTE_1, the center frequency Fc_1 of the measurement target cell is calculated as follows using the equation (1) when an E-UTRA operating band is BAND 1 and EARFC=324:

$$\begin{aligned}Fc\_1 &= F_{DL\_low} + 0.1(N_{DL} - N_{Offs-DL}) \\ &= 2110 + 0.1 \times (324 - 0) \\ &= 2142.2 \text{ MHz}\end{aligned}$$

The measurement target cell LTE_1 has a frequency range of 2137.2 MHz to 2147.2 MHz with a center frequency of 2142.2 MHz.

Here, when the number of divisions is equal to five, a frequency band "a" from 2137.2 MHz to 2142.2 MHz, which is lower than the center frequency, and a frequency band "b" from 2142.2 MHz to 2147.2 MHz, which is higher than the center frequency, are each divided in halves (four divisions in total). The frequency bands "a" and "b" each have a 5 MHz width. Thus, a unit of division frequency is determined as follows:

5 MHz/(two(Number of divisions)+1)=1.666 . . . MHz≠1 MHz (rounding down)

Accordingly, the dividing is performed by 1 MHz unit. In this case, the center frequencies are respectively calculated by adding or subtracting the unit of division frequency to or from the frequency that is the most distant from the center frequency. In the frequency band "a", $Fc\_4=2137.2$ MHz+1 MHz=2138.2 MHz $Fc\_5=2137.2$ MHz+1 MHz+1 MHz=2139.2 MHz In the frequency band "b", $Fc\_7=2147.2$ MHz−1 MHz=2146.2 MHz $Fc\_6=2147.2$ MHz−1 MHz−1 MHz=2145.2 MHz In this case, the reception quality measurement section 35 performs in Step S13 the reception quality measurement at the center frequency Fc_1 with a 1.4 MHz bandwidth, and further performs in Step S14 the reception quality measurements at the center frequencies Fc_4, Fc_5, Fc_6 and Fc_7 each with a 1.4 MHz bandwidth.

Reception Quality Measurement

In the reception quality measurements in Steps S3, S5, S13, and S14, reference signal received power (RSRP) and a received signal strength indicator (RSSI) are measured. RSSI is a received level observed at a mobile terminal. The received level includes all of thermal noise, interference power from other cells, power of desired signals from its own cell, and the like. RSRP is the reference signal received power, and a linear average value (W unit) of downlink reference signals (RS). RSRP only measures resource elements (RE) that include cell specific reference blocks (RB).

Figure 9B:
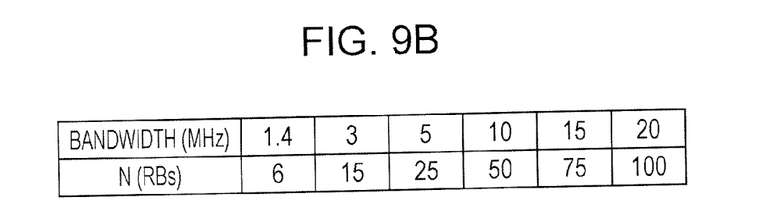

Next, reference signal received quality (RSRQ) is calculated by using the following equation (2), where a RB number is set to a different value in response to a bandwidth as illustrated in FIG. 9B. In FIG. 9B, the RB number is indicated as N, and equal to six for the 1.4 MHz bandwidth.

$$RSRQ=RSRP+10\log(RB\text{ number})-RSSI \quad (2)$$

Average Value Calculation

The average value calculation in Step S7 is performed as follows in the case illustrated in FIG. 7.

Figure 10:
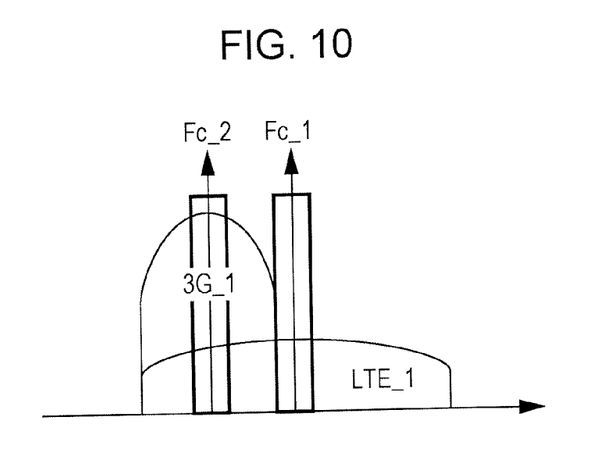
FIG. 10 is an explanatory diagram of a reception quality measurement.

Average value of $RSRP=[10^{(RSRP[Fc\_1]/10)}+10^{(RSRP[Fc\_2]/10)}+10^{(RSRP[Fc\_3]/10)}]/3$ Average value of $RSSI=[10^{(RSSI[Fc\_1]/10)}+10^{(RSSI[Fc\_2]/10)}+10^{(RSSI[Fc\_3]/10)}]/3$ Average value of $RSRQ=$Average value of $RSRP+10\log(RB\text{ number})-$Average value of $RSSI$ Another Situation Next, a situation different from those of FIG. 7 and FIG. 8 is described. FIG. 10 illustrates a case where a mobile terminal is located in a 3G serving cell and a LTE cell that is the measurement target cell is present as a neighboring cell.

In FIG. 10, 3G (3G_1) with a 5 MHz bandwidth is the serving cell in which the mobile terminal is located. LTE (LTE_1) with a 10 MHz bandwidth is present as the neighboring cell. In this case, the center frequency of 3G_1 is Fc_2, and the center frequency of LTE_1 is Fc_1. It is assumed here that the mobile terminal already obtained the neighboring cell information of LTE_1 from the broadcast information from 3G_1 that is its serving cell.

In this case, the reception quality measurement is also performed according to the flowchart illustrated in FIG. 6. That is, in Step S3, the reception quality measurement is performed at the center frequency Fc_1 of LTE_1 with the 1.4 MHz bandwidth, and further in Step S5 the reception quality measurement is performed at the center frequency Fc_2 of 3G_1 with the 1.4 MHz bandwidth. Furthermore, in Step S7, a result of the reception quality measurement at the center frequency Fc_1 with the 1.4 MHz bandwidth and a result of the reception quality measurement at the center frequency Fc_2 with the 1.4 MHz bandwidth are averaged to obtain the reception quality of the measurement target cell.

Second Embodiment

As described above, RSSI is the received level observed at a mobile terminal, and this received level includes all of thermal noise, interference power from other cells, power of desired signals from its own cell, and the like. RSRP is the reference signal received power, and a linear average value of downlink reference signals. RSRP only measures resource elements that include cell specific reference blocks (RB). Thus, in the second embodiment, the measurement of RSSI that is affected by other cells is performed across a system bandwidth.

Figure 11:
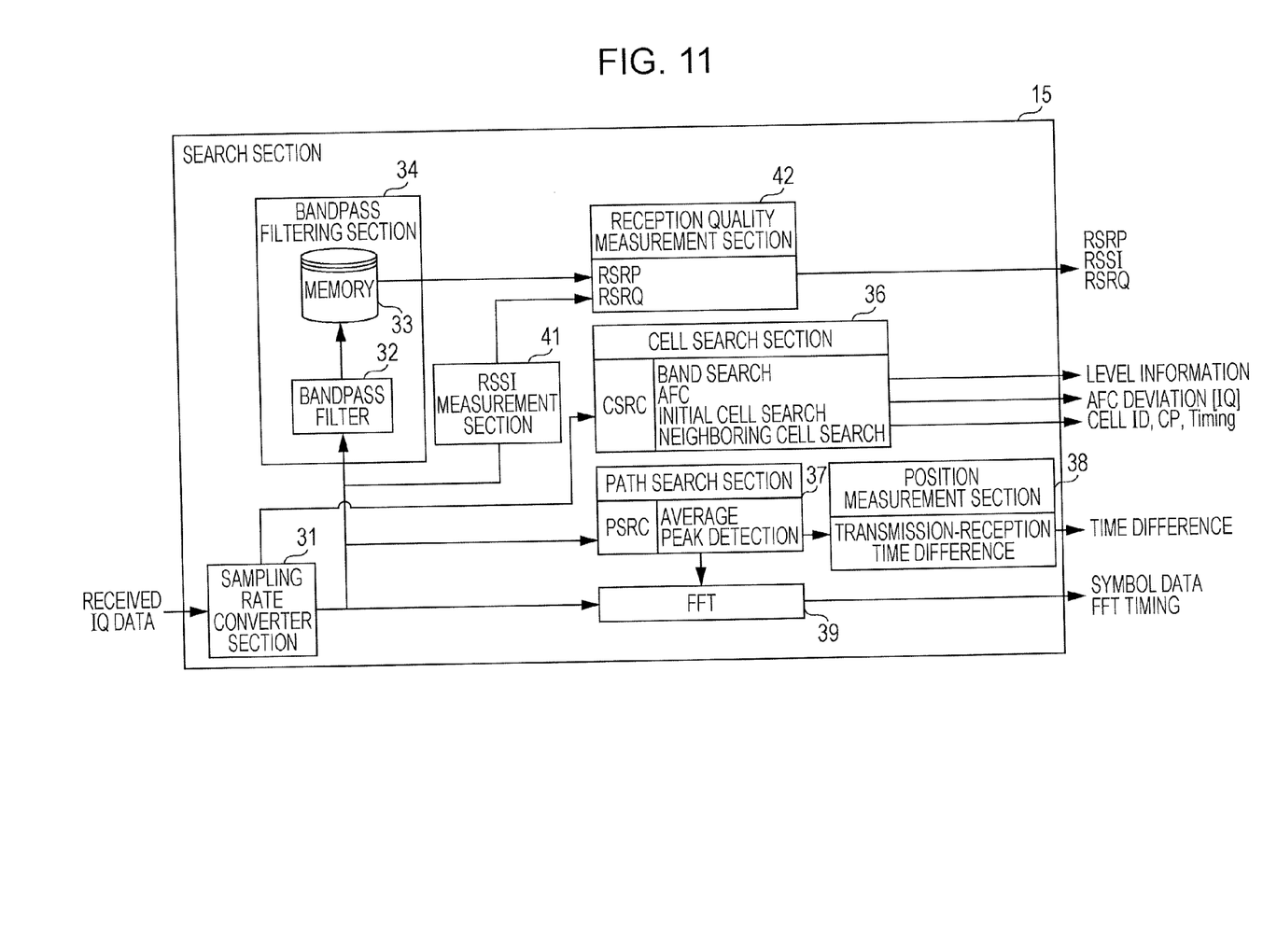
FIG. 11 is a configuration diagram of a second embodiment of the search process section.

FIG. 11 is a configuration diagram of the second embodiment of the search process section 15. In FIG. 11, a sampling rate converter section 31 converts a sampling rate (A) of A/D conversion in the RF interface 14 for the received base band signal to a sampling rate (B) of the base band section 13. As preprocessing of that conversion, an amplitude correction of the base band signal is performed. The sampling rate (A) varies in response to a system band, and the sampling rate (B) is fixed at 30.72 Msps. The base band signal, the sampling rate of which is converted, is supplied to a bandpass filtering section 34, a cell search section 36, a path search section 37, a FFT section 39, and a RSSI measurement section 41.

The bandpass filtering section 34 includes a bandpass filter 32 and a memory 33. The bandpass filter 32 performs filtering of the received signal of a measurement target cell for the reception quality measurement, and allows part of the received signal to pass with a passband of 1.4 MHz around a center frequency. Two independent circuits each including the bandpass filter 32 are provided when the number of reception antenna branches is two. The memory 33 stores an output signal of the bandpass filter 32. The memory 33 has a memory size large enough to store data of 5 ms+1 symbol (extended CP). The output signal of the bandpass filter 32, which is stored in the memory 33, is then supplied to a reception quality measurement section 42.

The RSSI measurement section 41 measures RSSI across the system bandwidth from the base band signal, and supplies it to the reception quality measurement section 42.

The reception quality measurement section 42 measures RSRP of the measurement target cell from the output signal of the bandpass filter 32, and calculates RSRQ by using RSRP thus measured and RSSI received from the RSSI measurement section 41. RSSI, RSRP, and RSRQ are transmitted to the CPP 22 as the reception quality measurement results.

The cell search section 36 receives an output from the RF interface 14, performs processes of band search, AFC, initial cell search, and neighboring cell search, and transmits level information, AFC deviation, cell ID, timing information, and the like to the CPP 22.

The path search 37 receives the output from the RF interface 14, performs processes of averaging and peak detection, and supplies results of the processes to a position measurement section 38. The position measurement section 38 measures a transmission-reception time difference, and transmits this transmission-reception time difference to the CPP 22.

The FFT section 39 receives the output from the RF interface 14 and the transmission-reception time difference from the position measurement section 38, performs the FFT process on the output from the RF interface 14, and transmits FFT timing and symbol data that is a result of the process to the CPP 22.

Figure 12:
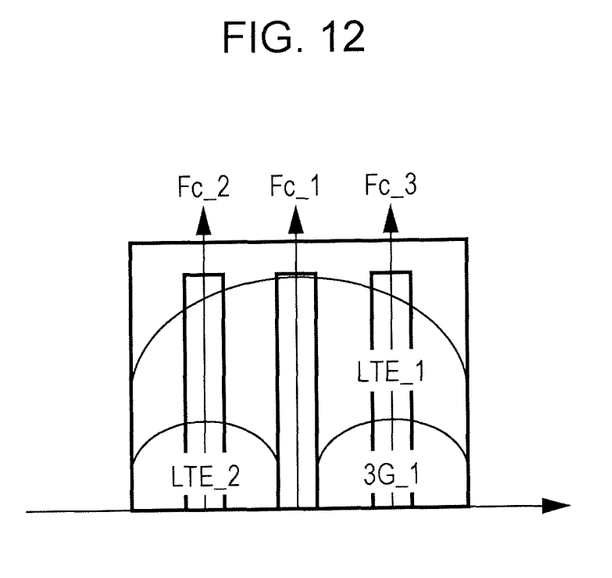
FIG. 12 is an explanatory diagram of a reception quality measurement.

FIG. 12 is an explanatory diagram of the reception quality measurement in the second embodiment. In FIG. 12, a mobile terminal is located in LTE (LTE_1) having a 10 MHz bandwidth, and this LTE (LTE_1) overlaps with LTE (LTE_2) and 3G (3G_1) each having a 5 MHz bandwidth. Here, LTE_1 is the measurement target cell. The center frequency of LTE_1 is Fc_1, the center frequency of LTE_2 is Fc_2, and the center frequency of 3G_1 is Fc_3. The mobile terminal has already obtained the center frequencies Fc_1, Fc_2, and Fc_3 from the neighboring cell information broadcasted from LTE_1.

In this case, the reception quality measurement section 42 performs in Step S3 the measurement of RSRP at the center frequency Fc_1 with a 1.4 MHz bandwidth, and further performs in Step S5 the measurements of RSRP at the center frequencies Fc_2 and Fc_3 each with a 1.4 MHz bandwidth. Subsequently, in Step S7, the average value of RSRP is obtained. With regard to RSSI, the reception quality measurement section 42 receives, as the average value of RSRI, the value measured by the RSSI measurement section 41 in Step S7 across the system bandwidth that is a 10 MHz bandwidth. Subsequently, the reception quality measurement section 42 calculates the average value of RSRQ from the foregoing average values of RSRP and RSRI.

According to each of the embodiments, even when the reception quality measurement is performed with the 1.4 MHz bandwidth, by utilizing the neighboring cell information, the reception quality measurement may be performed in consideration of the band overlapping with the neighboring cell, and measurement accuracy may be secured. Furthermore, even when no neighboring cell information is obtained, by dividing the measurement band and performing the reception quality measurement with the 1.4 MHz bandwidth, the reception quality measurement may be performed in consideration of the band overlapping, and measurement accuracy may be secured. Furthermore, the circuit size may be reduced by performing the reception quality measurement with the 1.4 MHz bandwidth.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A reception quality measurement method for measuring reception quality of a measurement target cell at a mobile terminal apparatus, the reception quality measurement method to be implemented via one or more processors for mobile communications, the reception quality measurement method comprising:

performing, via the one or more processors, reception quality measurements in a bandwidth with respect to each of a plurality of frequencies in a center frequency band of the measurement target cell, when the frequency band of the measurement target cell and a frequency band of a neighboring cell overlap each other;

averaging, via the one or more processors, results of the reception quality measurements at the plurality of frequencies so as to obtain an averaged value as the reception quality of the measurement target cell for the mobile communications; and providing the averaged value as the reception quality of the measurement target cell for use in cell reselection.

2. The reception quality measurement method according to claim 1, further comprising:

determining whether the frequency band of the measurement target cell and the frequency band of the neighboring cell overlap each other, based on neighboring cell information obtained from broadcast information, and determining the plurality of frequencies at which the reception quality measurements are to be performed.

3. The reception quality measurement method according to claim 2, wherein the plurality of frequencies, at which the reception quality measurements are to be performed, are set at respective center frequencies of the measurement target cell and the neighboring cell.

4. The reception quality measurement method according to claim 2, further comprising:

when the neighboring cell information is not obtained, dividing the frequency band of the measurement target cell a plurality of divisions, and determining the plurality of frequencies at which the reception quality measurements are to be performed.

5. The reception quality measurement method according to claim 4, wherein a number of the plurality of divisions varies according to a bandwidth of the measurement target cell.

6. The reception quality measurement method according claim 1, wherein the reception quality measurement, which is performed at the plurality of frequencies each with a certain bandwidth, includes measurements of reference signal received power and received signal strength and a calculation of a reference signal received quality, the reference signal received quality being based on the reference signal received power and the received signal strength.

7. The reception quality measurement method according to claim 1, wherein the reception quality measurement, which is performed at the plurality of frequencies each with a certain bandwidth, includes a measurement of reference signal received power and a measurement of received signal strength with a bandwidth of the measurement target cell; and an averaged reference signal received quality is calculated from the received signal strength measured with the bandwidth of the measurement target cell and an averaged value of the reference signal received power at the plurality of frequencies.

8. A mobile terminal configured to measure reception quality of a measurement target cell, the mobile terminal comprising:

a measurement module comprising one or more processors and configured to perform reception quality measurements in a bandwidth with respect to each of a plurality of frequencies in a center frequency band of the measurement target cell, when the frequency band of the measurement target cell and a band of a neighboring cell overlap each other; and an averaging module comprising the one or more processors and configured to:

average results of the reception quality measurements at the plurality of frequencies so as to obtain an averaged value as the reception quality of the measurement target cell for mobile communications, and provide the averaged value as the reception quality of the measurement target cell in cell reselection.

9. The mobile terminal according to claim 8, wherein the measurement module is further configured to determine whether the frequency band of the measurement target cell and the frequency band of the neighboring cell overlap each other, based on neighboring cell information obtained from broadcast information, and determine the plurality of frequencies at which the reception quality measurements are to be performed.

10. The mobile terminal according to claim 9, wherein the measurement module is configured to set the plurality of frequencies, at which the reception quality measurements are to be performed, at respective center frequencies of the measurement target cell and the neighboring cell.

11. The mobile terminal according to claim 9, wherein when the neighboring cell information is not obtained, the measurement module is configure to divide the frequency band of the measurement target cell into a plurality of divisions and determine the plurality of frequencies at which the reception quality measurements are to be performed.

12. The mobile terminal according to claim 11, wherein the measurement module is configured to vary a number of the plurality of divisions according to a bandwidth of the measurement target cell.

13. The mobile terminal according to claim 8, wherein in the reception quality measurement which is performed at the plurality of frequencies each with a predetermined bandwidth, the measurement module is configured to measure reference signal received power and received signal strength, and calculate reference signal received quality based on the reference signal received power and the received signal strength.

14. The mobile terminal according to claim 8, wherein in the reception quality measurement which is performed at the plurality of frequencies each with a predetermined bandwidth, the measurement module is configured to measure reference signal received power, and measure received signal strength with the bandwidth of the measurement target cell; and the averaging module is configured to calculate an averaged reference signal received quality from the received signal strength measured with the bandwidth of the measurement target cell and an averaged value of the reference signal received power at the plurality of frequencies.

* * * * *

UNITED STATES PATENT AND TRADEMARK OFFICE
CERTIFICATE OF CORRECTION

PATENT NO. : 9,002,360 B2  
APPLICATION NO. : 13/933727  
DATED : April 7, 2015  
INVENTOR(S) : Satoshi Mikami Page 1 of 1

It is certified that error appears in the above-identified patent and that said Letters Patent is hereby corrected as shown below:

On the Title Page

Assignee reads:

(73) Assignee: Fujitsu ~~Limted~~, Kawasaki (JP)

Should read:

(73) Assignee: Fujitsu <u>Limited</u>, Kawasaki (JP)

Signed and Sealed this  
Twenty-first Day of July, 2015

Michelle K. Lee  
*Director of the United States Patent and Trademark Office*